United States Patent [19]

Hanemaayer

[11] Patent Number: 4,550,946
[45] Date of Patent: Nov. 5, 1985

[54] VAN LAYOUT

[76] Inventor: Jacobus N. Hanemaayer, 75 Ardelt Pl., Kitchener, Ontario, Canada

[21] Appl. No.: 409,549

[22] Filed: Aug. 19, 1982

Related U.S. Application Data

[63] Continuation-in-part of Ser. No. 348,695, Feb. 16, 1982, abandoned.

[30] Foreign Application Priority Data

May 26, 1982 [CA] Canada .................. 403776

[51] Int. Cl.[4] .......................... B60P 3/36; B60P 3/38; B60R 15/00; A47B 61/00
[52] U.S. Cl. .................. 296/156; 296/24 R; 296/174; 5/9 R; 5/118; 4/597; 4/599; 105/321; 105/319; 312/240
[58] Field of Search .............. 296/24 R, 156, 168, 296/164, 169, 174, 64, 65 R, 69, 170; 5/8, 9 R, 118, 10 R, 10 B; 4/596, 599, 600, 612, 613, 614, 597; 297/105, 111, 63, 67, 445, 458, 330; 105/319, 321; 312/199, 240, 60

[56] References Cited

U.S. PATENT DOCUMENTS

| | | | |
|---|---|---|---|
| 1,008,957 | 11/1911 | Cox | 4/599 |
| 1,495,413 | 5/1924 | Hopponen | 4/600 |
| 1,722,916 | 7/1929 | Heumader | 5/118 |
| 1,796,112 | 3/1931 | McArthur, Jr. | 296/174 |
| 1,832,767 | 11/1931 | Dameron | 296/156 |
| 1,945,875 | 2/1934 | Woller | 5/9 R |
| 2,247,340 | 6/1941 | Webster | 296/168 |
| 2,320,614 | 6/1943 | Kleine | 296/24 R |
| 2,558,470 | 6/1951 | Vandermark | 296/174 |
| 2,743,955 | 5/1956 | Willson | 296/156 |
| 3,067,434 | 12/1962 | Neal et al. | 4/599 |
| 3,463,539 | 8/1969 | Racine et al. | 296/174 |
| 3,494,656 | 2/1970 | McIntire | 296/156 |
| 3,567,272 | 3/1971 | Low | 296/156 |
| 3,758,147 | 9/1973 | Burton | 296/156 |
| 3,916,462 | 11/1975 | Riches | 296/174 |
| 3,948,559 | 4/1976 | Hain et al. | 297/330 |
| 4,005,898 | 2/1977 | Way | 296/174 |
| 4,054,956 | 10/1977 | Quakenbush | 5/9 R |
| 4,091,477 | 5/1978 | Lewis et al. | 4/597 |
| 4,253,699 | 3/1981 | Frank | 296/25 |
| 4,292,697 | 10/1981 | Alembik | 297/105 |
| 4,417,774 | 11/1983 | Bevan et al. | 312/108 |

FOREIGN PATENT DOCUMENTS

| | | |
|---|---|---|
| 524700 | 5/1956 | Canada . |
| 748762 | 12/1966 | Canada . |
| 765725 | 8/1967 | Canada . |
| 951765 | 7/1974 | Canada . |
| 297881 | 10/1928 | United Kingdom ............ 296/164 |

Primary Examiner—Robert B. Reeves
Assistant Examiner—Dennis H. Pedder
Attorney, Agent, or Firm—John J. Byrne; Bradford E. Kile; Kevin M. O'Brien

[57] ABSTRACT

The single room interior space of a compact motorvan for most daytime living converts quickly into three private compartments by simply opening a set of dual function folding doors (movable partitions) exposing a toilet and bigger than average shower stall area (latter doubling as coat closet) and at the same time forming a central compartment, thereby automatically creating two more private compartments in front and rear. The kitchen facilities located in the central compartment, opposite from the toilet and shower/coat closet area, are used when the doors cover that area from view. This central utility compartment is always available for active use and never occupied by seats, table or beds. The four seats in the instantly creatable front compartment rapidly convert to two, wide single beds, with ample space between them for quick exit or access to the central privacy compartment. There is also an easily and quickly stowable overhead double adult size bed in this front compartment. The mattress base is suspended in mid air, supported by flanges on horizontal members when in the downwardly pivoted position, which are hinged on shelves located above window line. When not in use, base is stored above driving compartment, away from the adult height standing area. The instantly available rear compartment may feature a dinette or a chesterfield. Both convert to a regular adult size double bed.

26 Claims, 11 Drawing Figures

VAN LAYOUT

CROSS REFERENCE TO RELATED APPLICATIONS

This application is a continuation-in-part of my application Ser. No. 348,695 filed Feb. 16, 1982, abandoned.

BACKGROUND OF THE INVENTION

This invention relates to a motor van, and more particularly, to a motor van having separable compartments creating integrated mobile living quarters.

Although large motor homes and trailers have been in use for a number of years, recent increases in fuel costs have created a need for more compact motor homes capable of providing all of the amenities of the larger motor homes but at a saving in fuel cost and space. Other considerations are greater flexibility and greater ease of handling. The ideal motor home would represent a compromise of these features and contain an interior allowing for both a single living space during the major part of the travelling day and division of that living space during the remainder of the day into separated compartments for specialized activities such as sleeping, cooking and personal hygiene.

Certain features are essential in a motor van being utilized as a motor home. It must contain comfortable seating for travelling, suitable kitchen facilities such as a stove and fridge, a toilet, a shower or similar wash facility, and sleeping quarters. Depending upon the space available in the motor van, one or more of these features may be placed in the same section of the van.

SUMMARY OF THE INVENTION

The subject invention is a motor van having an interior arranged to form a motor home that takes optimum advantage of the available space. Such vans may be provided in various lengths, their interior being separable into either two or three compartments depending upon available space. The forward compartment would generally contain a seating arrangement optionally convertible into several beds. In that same compartment, a stowable, overhead bed may be provided, that bed in its extended position resting on support means above the seating arrangement. If the length of the van allows, a fixed bed may also be installed in the separable rear compartment.

In the longest version of the motor van of the subject invention, both central and rear separable compartments are provided. In the shortest version of the motor van only forward and rear separable compartments are provided. Intermediate size versions of the motor van are also available. A kitchen facility, toilet, and shower stall occupy the central separable compartment in the longest version of the motor home, such facilities being in the rear compartment in the shortest version of the motor van. The kitchen facility has a balanced weight distribution. A preferred embodiment of the kitchen comprises a sink, a grill area, a fridge, kitchen cabinets and overhead cupboards. The toilet is preferably of the conventional type for motor homes and connects to a waste storage tank mounted under the floor of the van. The shower stall is of a unique construction and has a fold-out coat rack assembly pivotally connected to its frame so as to double as a storage closet. The toilet and shower stall are located in what is broadly termed a toilet region and are associated with attractive cabinet coverings which double as foldable partitions to isolate those facilities in use from the remaining space in the van. The creation of privacy areas by the use of these dual function partitions is an important aspect of the invention.

The longest version of the motor van has a third separable compartment at the rear, the compartment housing a fixed bed or a dinette arrangement convertible into a bed. The bed formed in this compartment may be either additional to or in replacement of the bed formed by the convertible seating arrangement or the stowable, overhead bed. In this regard, it should be mentioned that in the shortest version of the van there is no room for a rear bed facility, the forward separable compartment of the van having both the convertible seating arrangement and the stowable, overhead bed.

BRIEF DESCRIPTION OF THE DRAWINGS

The subject invention will now be described in greater detail by way of example. In the drawings.

DETAILED DESCRIPTION

A preferred embodiment of the motor van of the subject invention will next be described utilizing the accompanying drawings.

Motor van 11 has the chassis and body of one of the vans commercially available in the marketplace. The van interior fixtures of the subject invention are adopted to be placed in a Dodge "Ram Series 250" van, although other vans available in the marketplace could be utilized to house the same or similar fixtures. Preferably, the chosen van will have an engine economic on gas, power steering, power brakes, and other features that contribute to a smooth comfortable ride, such as cruise control, steel belted tires, and a stabilizer bar.

The van of the preferred embodiment has side doors 12 and a rear door 13 to allow passengers rapid access to the van interior. Three separable sections or compartments are created in the motor van of FIGS. 1 and 2: a forward compartment 14, a central compartment 15, and a rear compartment 16 such sections or compartments being serially arranged in the lengthwise direction of the van body and being in close juxtaposition to one another. In a shorter version of the motor van of the subject invention there are only two compartments: a forward seating compartment and a rear compartment, the rear compartment containing fixtures similar to those that will subsequently be described in central compartment 15.

Figure 1:
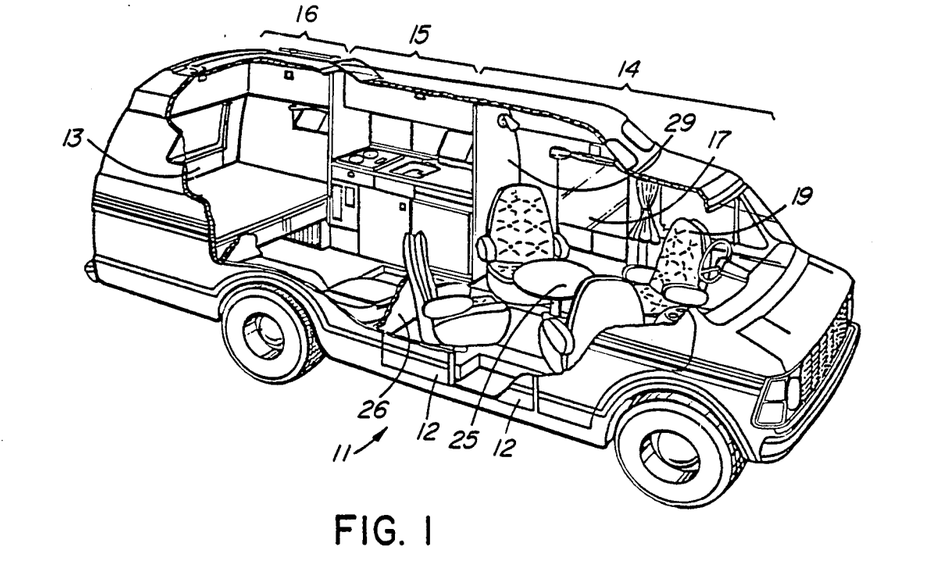
FIG. 1 is a perspective cutaway view of the right side of the longest version of the motor van.
Figure 2:
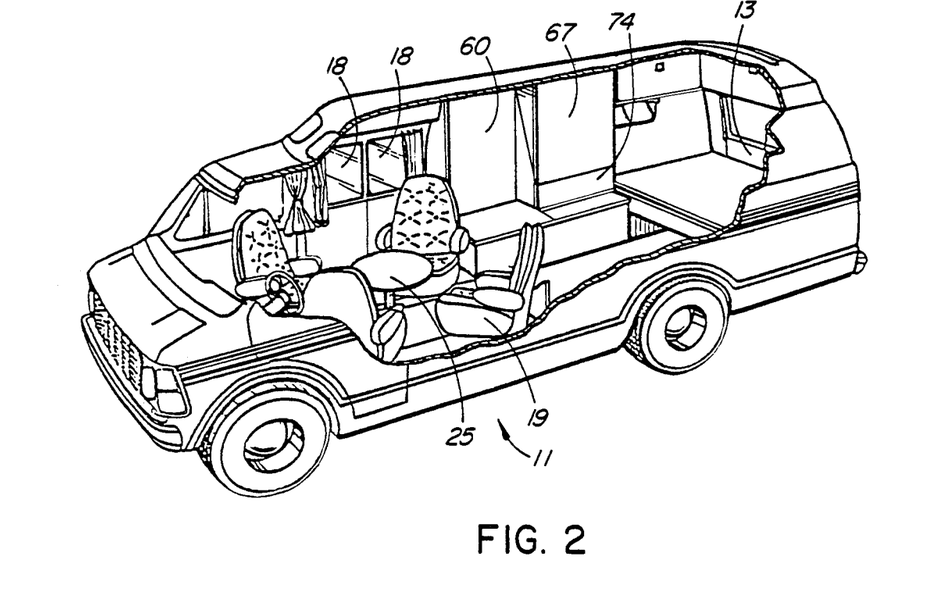
FIG. 2 is a cutaway perspective view of the left side of the motor van of FIG. 1.

Forward compartment 14 represents approximately half of the interior space of the van and has side windows 17 and 18 in addition to the standard windows to allow passengers seated in the forward compartment a panoramic view outside. FIGS. 1 and 2 illustrate four swivel seats 19 mounted in the forward compartment; however, as illustrated in FIGS. 5 to 8 inclusive, the two rear swivel seats may each be replaced by a fixed seat 20 which, in conjunction with the swivel seat forward thereof, may be converted into a bed as will subsequently be more fully explained. A table 25 is removably mounted in the forward compartment 14 such that it is central to either of the four swivel seats 19 or of the pair of front swivel seats 19 and the pair of fixed rear seats 20. The table may be eccentrically mounted to its support post and off centered relative to the floor to provide extra room when rotated out of its normal position. For driving, all swivel seats are in the forward position and table 25 could be detached from the floor and stored if desired.

Figure 5:
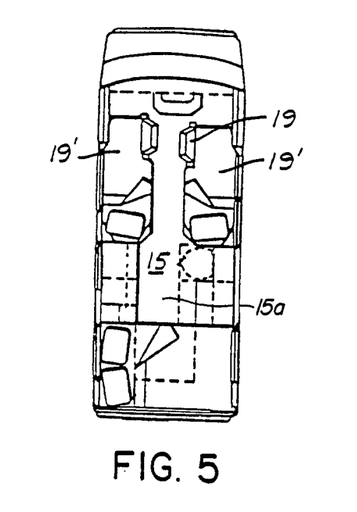
FIG. 5 is a plan view of the motor van interior of FIG. 4 illustrating a pair of beds formed by the convertible seating arrangement in the front area and either a fixed double bed in the rear area or a bed which is convertible to a dinette as shown in FIG. 4.
Figure 6:
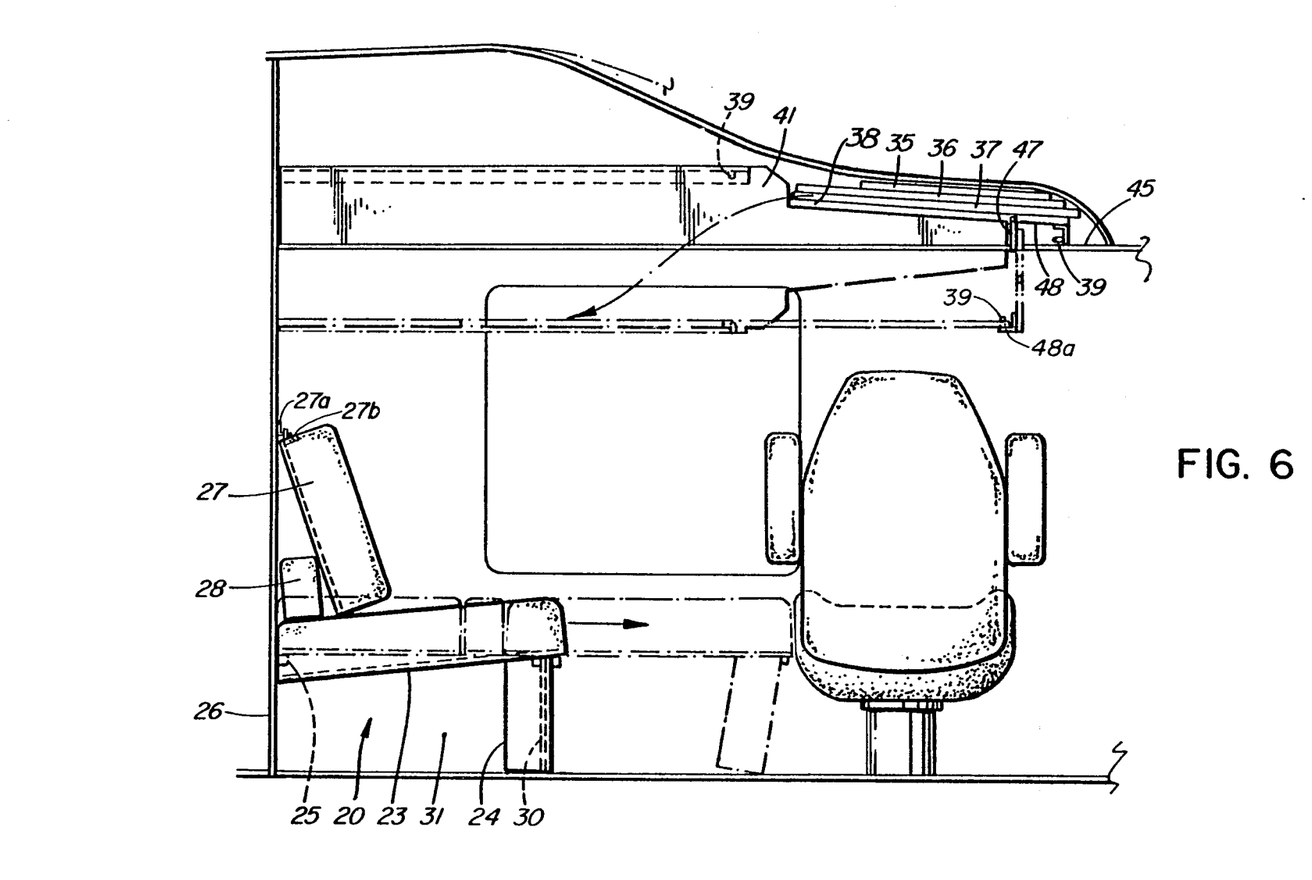
FIG. 6 is a cutaway view through the right side of the motor van illustrating the convertible seating arrangement and also illustrating the stowable, overhead bed.

FIGS. 3 to 6 illustrate a seating arrangement convertible to a pair of beds. Each bed 19' is formed by a forward swivel seat 19 and the associated fixed seat 20 located at the rear thereof. To form a bed, the swivel seat is rotated such that its back portion is proximate of the other swivel seat and its arms, which are pivotally connected to the back portion, are in the raised position (see FIG. 6). The fixed seat 20 which is behind the particular swivel seat 19 is modified to form an extended horizontal platform for the bed, as shown in outline in FIG. 6. Seat 20 has a seating portion 23 to which is rigidly secured at the forward end a vertical front plate 24. The side edges of seating portion 23 rest on a pair of forwardly extending vertical frame walls 31. A back rest 27 is provided with loops 27b on its upper edge which fasten to hooks 27a mounted on partition 26. Back rest 27 slopes downwardly away from partition 26, its lower portion being spaced from partition 26 by a cushion 28. As shown in FIG. 6, seating portion 23 of each rear seat 20 may be moved forward such that its front edge is adjacent to a side edge of the rotated swivel seat forwardly thereof. The rear edge of seating portion 23 in such forward position is supported by vertical frame support 30, that support sitting proximate of vertical front plate 24 when seating portion 23 is in the retracted position. With seating portion 23 in the forward position, back rest 27 is dislodged from the hooks that hold it to partition 26 and laid on a horizontal strip 25 rigidly secured to the partition 26 which separates the forward compartment from the adjoining compartment. The top edges of the pair of forwardly extended vertical frame walls 31 are covered by seating portion 23 and support the latter when in the retracted position. On the driver's side of the van, the two cushions 28 are placed on a support bridging the span between side walls 31 between seating portion 23 in its forward position and back rest 27 to form the bed; the driver's swivel seat is positioned slightly forwardly of the other swivel seat and the other bed does not require similar cushions. FIG. 6 illustrates in outline the bed formed on the driver's side by the rear seat in the extended position and by the rotated swivel seat forward thereof, that swivel seat having been rotated counter-clockwise one-quarter turn and its arms pivoted to the raised position. FIG. 5 illustrates the two beds 19' that are thus formed in the forward compartment, the bed on the driver's side being of slightly greater length. The relatively wide seating portion 23 which forms the central portion of the bed provides extra room for the sleeper where it is most needed. Suitable means, not shown, are provided to lock the swivel seats 19 in their forward, driving positions whereby to prevent unwanted turning of same about their vertical swivel axes. The space between vertical walls 31 under seating portion 23 in the retracted position is normally used to store bedding and similar items.

Figure 7:
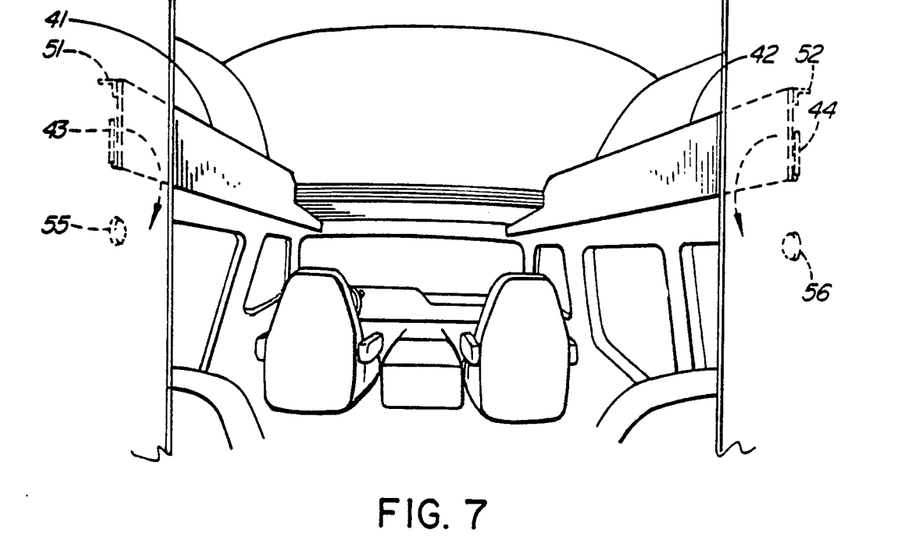
FIG. 7 is a perspective forward view of the forward compartment illustrating the stowable, overhead bed in the retracted position.
Figure 8:
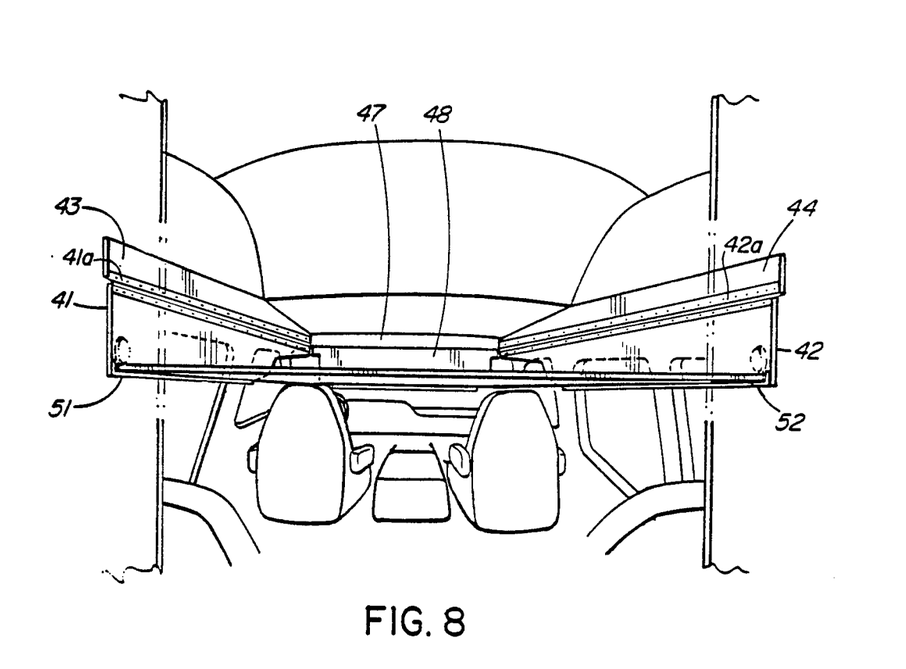
FIG. 8 is a perspective forward view of the forward compartment illustrating the stowable, overhead bed in the extended position.

An alternate bed arrangement for the forward compartment of the van is illustrated in FIGS. 6, 7, and 8. The alternate arrangement, which finds greater application to a van housing four swivel seats in the forward compartment, is a stowable overhead bed comprising three boards 35, 36, and 37, each of similar length but of different width, board 37 being wider than board 36 which is wider than board 35. The three boards together form the base of the stowable bed, the boards being supported by three fold-down support members, two of which are each pivotally secured to a respective side of the van above the windows and the third of which is pivotally secured to a horizontal shelf at the forward end of the van. The support members pivotally secured to the side walls of the van are boards 41 and 42 which are hinged at 41a and 42a, respectively, to boards 43 and 44, respectively, the latter pair of boards being permanently mounted to a respective one of the side walls of the van. The support member at the forward end of the van is pivotably mounted to the rearward edge of horizontal shelf member 45 which extends laterally across the van proximate of the top of the windshield. The forward support member consists of two boards hinged together such that in their retracted position a first one of the boards 47 extends generally vertically and the other board 48 extends generally horizontally. The hinges on boards 47 and 48 are positioned such that with boards 35, 36, and 37 unstowed, boards 47 and 48 may be pivoted as a unit on the hinge connecting board 47 to the rearward edge of horizontal ledge 45. That hinge, which in the stowed bed position is on the lower edge of board 47, is on the upper edge of board 47 after such rotation. Board 47 is then rotated relative to board 48 until the two boards hang in vertical planar alignment (as shown in dashed lines in FIG. 6). Boards 41 and 42 may assume either a raised position, as shown in FIG. 7, or a lowered position, as shown in FIG. 8; the two boards have angle iron members 51 and 52, respectively, secured to their lower edges as those edges are defined in the lowered position. This arrangement is illustrated in FIGS. 7 and 8. Board 48 also has a length of angle iron 48a extending along its lower edge and best seen in the lowered position (shown in dahsed lines in FIG. 6). The boards 35, 36 and 37 rest upon the three sections of angle iron 48a, 51 and 52, as illustrated in outline in FIG. 6. Of boards 35, 36 and 37, the board placed in the forward position has holes extending through its thickness on one of its longer edges and on the two corners facing that edge. Pins 39 located to correspond to the holes in the forwardly positioned board extend from the three sections of angle iron such that placement of the pins 39 into the holes on the forwardly positioned board locks the forward and side support members in a defined spatial relationship. Boards 41 and 42 are thus prevented from moving laterally outward and board 48 is prevented from moving forwardly. The position of pins 39 and the corresponding holes in the forwardly positioned board are illustrated in FIG. 6. Stops 55 and 56 are each fastened to partitions 29 and 26 respectively at the rear edges of boards 41 and 42, respectively, to further prevent those boards from moving outwardly.

Boards 41 and 42 serve a double purpose for the storable bed. Not only do they support boards 35, 36 and 37 when those three boards are in their lowered position, but they also prevent those three boards from sliding back when in their raised position. As shown in FIGS. 6, 7 and 8, boards 41 and 42 are cut such that their forward ends are of decreased depth to match with a ledge defined by strips 38; boards 35, 36 and 37 rest upon these strips 38 which are permanently mounted to the forward ends of permanently mounted boards 43 and 44. All of the hinges used in the stowable bed assembly are preferably of the piano hinge variety and extend the length of the hinged surfaces thus providing ample support when the bed is in use.

Figure 3:
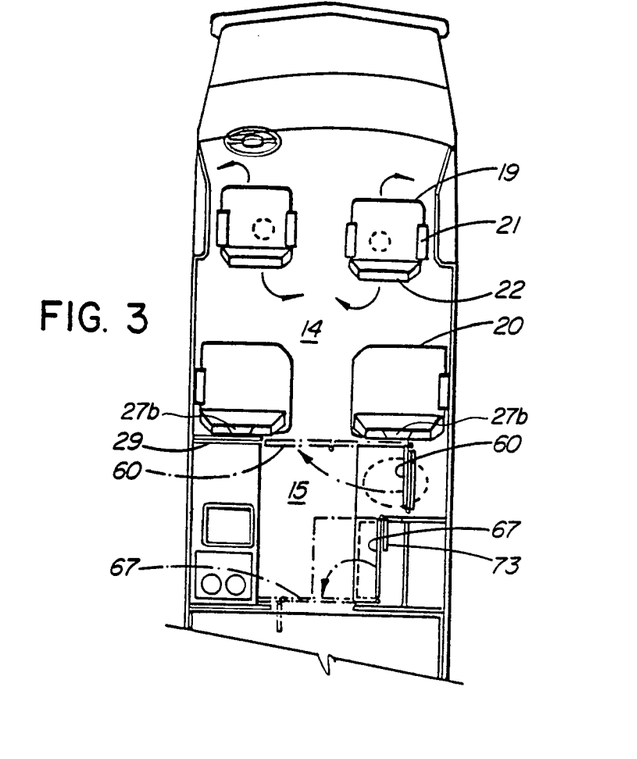
FIG. 3 is a plan view of the motor van interior illustrating a seating arrangement convertible to a pair of beds and also illustrating the toilet and shower stall covering pivoted to form a privacy compartment.
Figure 4:
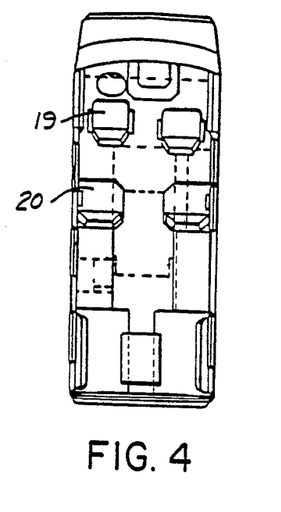
FIG. 4 is a plan view of a motor van interior as in FIG. 3, and additionally illustrating a rear dining compartment which is convertible to a double bed as shown in FIG. 5.
Figure 9:
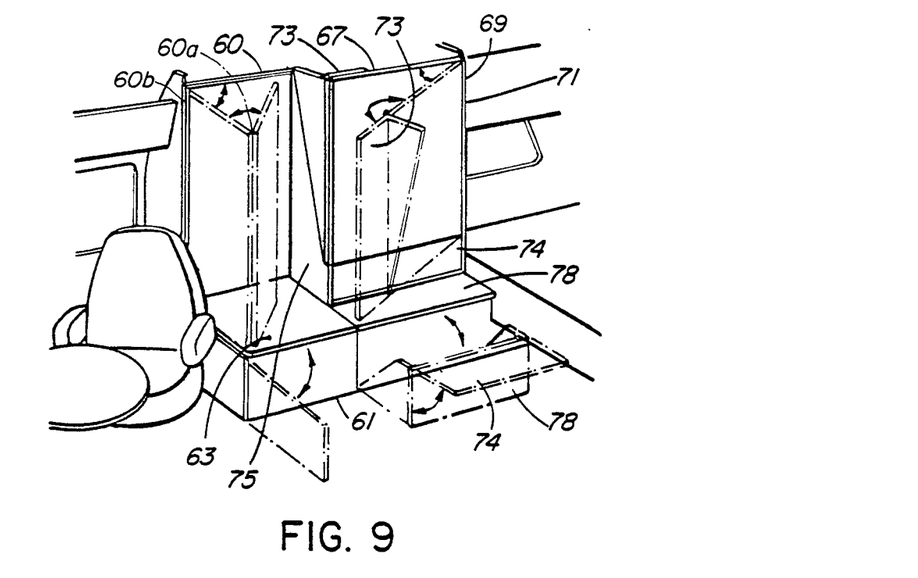
FIG. 9 is a perspective view of the covered toilet and shower stall facility of the motor van, illustrating in outline a partial fold-out position for the covering.
Figure 10:
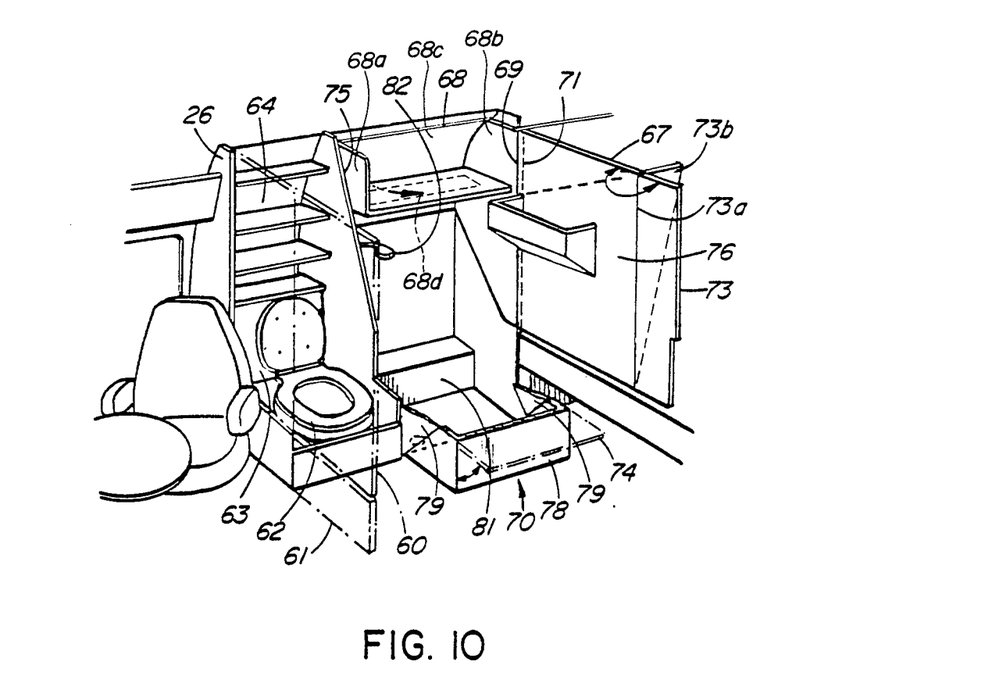
FIG. 10 is a perspective view of the toilet and shower stall facility after movement of the covering to a position to form a separated privacy compartment.
Figure 11:
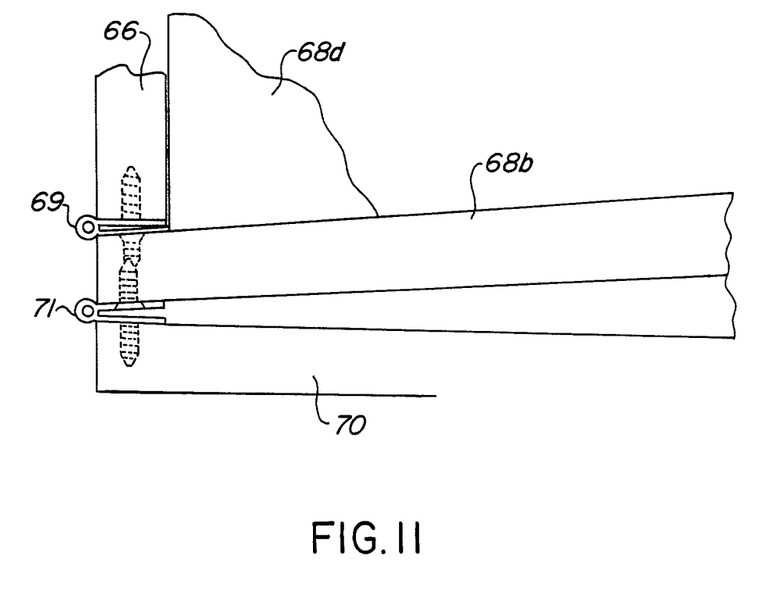
FIG. 11 is a fragmentary plan view illustrating the hinge and panel structure associated with the swing out coat rack-shower stall combination.

The separable privacy compartment behind the forward compartment, as illustrated in FIGS. 1, 2, 3, 9 and 10, will now be described in detail. For better clarification, the separable privacy compartment is designated as region 15 of the van of FIG. 1. That compartment defines on one side a toilet region which contains a flush toilet and an adjoining shower stall and coat rack facility, as well as an oppositely disposed kitchen facility all of which are mounted either to or alongside the side walls of the van body. A longitudinally extending passageway 15a(FIG. 5) extends through such compartment and provides communication between the main compartments or sections 14, 15 and 16 of the van. The toilet region may be considered as extending the full length of the central compartment 15 adjacent an associated sidewall of the van. The folding doors which define partitions movable from positions covering and concealing this toilet region (and the facilities therein) from view, to other positions wherein such toilet region, and its facilities, are opened and exposed for use, will now be described. The upper portion of the toilet is covered by a folding door 60 having a pair of panels of substantially similar size hinged together along their long edges by hinge 60a and which can be unfolded, as shown in FIGS. 3 and 10 to extend from partition 26 (to which door 60 is hinged as seen in FIGS. 3, 9 and 10) by hinge 60b to partition 29 which abuts the forward end of the kitchen facility. With folding door 60 in the folded condition its two panels overlie one another in a plane recessed from the front of the toilet, blocking the use of the toilet, with the hinges which support the two panels being located at opposite sides of the toilet as seen in FIGS. 3 and 9. With folding door 60 in the extended position, front cabinet panel 61 may be pivoted on the hinge extending vertically on its edge to assume a position in coplanar alignment with the extended folding door 60. This is illustrated in FIG. 10. A sliding panel (not shown) can be slidably secured to the front cabinet panel 61 such that extended folding door 60 and front cabinet panel 61 essentially present a uniform wall to the forward compartment of the van. As mentioned, this wall extends laterally in the van such that its outer edge is proximate the edge of the fixed partition 29 (see FIG. 3). Flush toilet 62 is of a conventional design for motor homes and is connected to a waste storage tank located under the floor of the motor van. Top cabinet panel 63 of the toilet is rigidly secured to the toilet seat and can be pivoted to an open position when folding door 60 is in the extended position. As shown in FIG. 10, the toilet has shelves 64 mounted thereabove, those shelves being utilized for storing toiletries and similar materials.

When the folding doors 60, 67 are in their extended positions to form the central privacy compartment, the space in front of the toilet region, including the passageway 15a, is effectively converted into usable space thus providing extra room for a person or persons when utilizing the privacy compartment.

The central compartment 15 is also separable from the rear compartment 16 of the van by means of a foldable door 67 as shown in FIGS. 3, 9 and 10 and comprising a large door panel 66 and a small panel or leaf 73. Foldable door 67 is pivotally connected to fold-out coat rack assembly 68 by vertically extending piano hinge 69 which extends parallel to the hinge 60b of folding door 60. Coat rack assembly 68 is in turn pivotally connected to the frame of shower stall 70 by vertically extending piano hinge 71 which extends parallel to and slightly rearwardly on the van from hinge 69. Foldable door panel 66 has the leaf 73 pivotally connected thereto by a piano hinge 73a leaf 73 extending vertically along the outer edge of foldable door panel 66 and a wedge shaped panel 73b is fixed to the same edge as hinge 73a is fixed but it is on the outside. Panel 66 is sufficiently wide as to cover the entire front face of the shower stall. Leaf 74 extends horizontally along the upper edge of the foldable base portion 78 of the shower stall and is connected thereto by a piano-type hinge. When foldable door 67 is in its closed position, its leaf 73 folds in behind the door panel 66, as shown in FIG. 9, and wedge-shaped panel 73b butts up to the sloping partition 75 which separates the toilet from the shower stall. A deep tray 76 is secured to the back surface of folding door 67.

Fold-out coat rack assembly 68 consists of a shelf surrounded by a pair of side panels 68a, 68b and a rear panel 68c, as shown in FIG. 10. The side panel 68b to which piano hinge 69 is fastened extends approximately two-thirds the height of the shower stall, the other side panel 68a extending only upwardly from the shelf to the top of the shower stall. The back panel extends downwardly behind the shelf at an angle, as shown in FIG. 10, all of the panels of the coat rack assembly being so positioned to fit into the shower stall, which is shaped to conform to the side of the van. A coat rack 68d (shown in dashed lines in FIG. 10) is secured to the underside of the shelf of the coat rack assembly.

Shower stall 70, as shown in FIG. 10 may be of a moulded rigid plastic construction or of a plastic-plywood laminate. The shower stall has an integral foldable base portion 78 connected to its main portion by a flexible piece of vinyl 79. The flexible vinyl piece extends across a V-shaped cut in each side of the lower part of the shower stall. The front base portion of the shower stall is rotatable between an upper retracted position (wherein it is located generally below the foldable door 67 to form a lower cover for the shower stall) along a fold line connecting the apices of the V-shaped cuts, to an extended horizontal position for use closely adjacent to or on the floor of the motor van. The fold line is defined by a hinge and the vinyl 79 is of one piece and extends completely across the assembly to cover the hinge and prevent leakage of water. The lower main portion of the shower stall has a seat 81 integrally formed therein, shower head 82 being mounted on a flexible shower hose for ease of handling by a person seated on seat 81. A shower curtain (not shown) is detachably secured to a plurality of clips (which may be Velcro-covered knobs) on the ceiling of the van and hangs such that its lower end is inside of the base portion of the shower stall. When the shower stall is no longer required, coat rack assembly 68 is rotated back into its position in the shower stall and the shower curtain (not shown) rests against the back panel of the coat rack assembly. Fasteners are employed to hold folding door 60, foldable door 67 and fold-out coat rack assembly 68 in either their closed or extended positions.

The rear compartment of the van may be utilized for several different functions. Firstly, it may house a fixed bed as shown in FIGS. 1 and 2. Alternatively, it may house a bed convertible into a central table with a bench along each side of the van (see FIGS. 5 and 4). It is also possible to have a permanent dinette arrangement in the rear portion of the van. In that compartment, overhead cabinets are provided for storing bedding, table linen and similar items.

The foregoing description has related to the longest version of the van to which the features of the subject invention are applicable. However, it should be obvious that the features of the invention could also be repositioned so as to be accommodated in a van of shorter length. For instance, a shorter van might have only the contents of the forward and central compartments of the described embodiment. Or a shorter version of the van might not have a shower stall in the toilet region, instead having a regular clothes closet or other feature. It should be noted that when no shower is installed, door 67 and leaf 73 extend all the way to the floor. In that situation, door 60 is brought forward several inches into line with door 67 and wedge panel on leaf 73 omitted as the sloping partition 73 is not there. The toilet is then moved back the same distance; the shelves behind it and the partition separating the toilet and shower stall are eliminated and door 60 brought down to the floor all the way as well so that lower door 61 can be eliminated also. In other words, the toilet and clothes closet are both placed in the same enclosure or toilet region with the two sets of folding doors being used to create the partitions. It is also possible for a dinette to be placed along one of the side walls of the van, replacing one of the rear seats in the forward compartment and also a portion of the central compartment.

I claim:

1. A mobile van having a van body comprising:
 (A) a plurality of main sections serially arranged in the lengthwise direction of the body and in close relation to one another;
 (B) one of said sections having at least a substantial portion of a kitchen facility mounted adjacent one side-wall of the van body, a toilet region being defined adjacent the opposing side wall of the van body within said one section and a passageway aligned with the lengthwise dimension of the van and defined between the toilet region and kitchen facility, said passageway providing for communication between said one section and each other main section which is adjacent thereto;
 (C) partition means associated with said one section and movable between (a) a first position clear of said passageway providing open communication between said one section and at least one other main section adjacent thereto whereby the combined spaces defined by said passageway, kitchen facility, and said at least one other section are available for communal use and (b) a second extended position across said passageway and separating said one section from said at least one other main section thereby forming separated compartments and converting said one section into a segregated compartment to enable said toilet region to be used in privacy, and
 (D) said partition means being adapted to at least partially cover and conceal said toilet region from view and block the use thereof when in said first position to enable the kitchen facility to be used while the toilet region is at least partly concealed, and said partition means further adapted to expose said toilet region for use within the thus converted compartment when in said second extended position so that a free open space defined at least in part by said toilet region and said passageway becomes accessible for use within the thus converted and segregated privacy compartment.

2. The mobile van of claim 1 wherein said main section comprise a central section flanked by a forward section and a rear section, and wherein said movable partition means includes a pair of movable partitions spaced apart in the lengthwise direction of the van body such that in their first positions, free communication between all said sections is provided, while in their second extended positions they isolate said central section from the other two sections thereby to define three separated compartments and enabling a person in the thus-defined central compartment to use the toilet region therein in privacy, and said forward and rear sections having means therein convertible to sleeping facilities and said passageway providing ready and direct access from said sleeping facilities to said central section in said first position of said partition means.

3. The mobile van of claim 1 wherein a flush toilet is located in said toilet region.

4. The mobile van of claim 2 wherein said toilet region has flush toilet and shower stall facilities adjacent the associated sidewall portion of the van.

5. The mobile van of claim 3 wherein said partition means comprise pairs of doors hinged to pivot about axes which are parallel to one another.

6. The mobile van of claim 2 wherein said means in said forward section convertible to sleeping facilities is capable of defining a pair of beds spaced apart laterally of the van body to define a walkway therebetween aligned with the passageway defined by said central section to facilitate passage between said beds and said central section.

7. A mobile van having a van body comprising:
 (A) a rear section, a central section, and a forward section; said sections being serially arranged in the lengthwise direction of the van body in juxtaposition to one another;

(B) said central section having at least a substantial portion of a kitchen facility mounted adjacent one side wall of the van body, a toilet region being defined adjacent the opposing side wall of the van body within said central section and a passageway aligned with the lengthwise dimension of the van and defined between the toilet region and kitchen facility, said passageway providing communication between said rear, central and forward sections;

(C) movable partition means operatively associated with said central section and movable between (a) a first retracted position clear of said of said passageway wherein free communication is provided between said central section and at least one of the other said sections whereby the combined spaces defined by said passageway, kitchen facility, and said at least one other section are available for communal use while at the same time said movable partition means at least partly conceals said toilet region from view and blocks the use thereof, and (b) a second extended position wherein said partition means extends generally laterally of the van body so as to form a temporary wall portion closing said passageway and temporarily separating said central section from at least one of the other two sections and thus converting such central section to a privacy compartment with at least a portion of said toilet region being at the same time open and accessible for use within said central section so that a substantial portion of the space defined by said central section, including the space defined by said passageway, is made available for use by a person occupying the converted privacy compartment.

8. The mobile van of claim 7 wherein said movable partition means includes a pair of movable partitions spaced apart in the lengthwise direction of the van body such that in their second extended positions they isolate said central section from the other two sections thereby to define three separated compartments within said van body and enabling persons in the thus-defined central compartment to use said toilet region therein in privacy.

9. The mobile van of claim 8 wherein said movable partition means comprise first and second doors, each hinged to a respective portion fixed to the van body and pivotable from retracted positions overlying and concealing at least a substantial portion of said toilet region, to said extended positions wherein they serve to isolate said central section from the other sections.

10. The mobile van of claim 8 wherein at least one of said rear and forward sections therein includes means convertible into sleeping accommodations whereby persons using such sleeping accommodations have ready access to the toilet region in said central section.

11. The mobile van of claim 10 wherein said forward section includes said means convertible into sleeping accommodations and capable of defining a pair of beds spaced apart laterally of the van body to define a walkway therebetween aligned with the passageway defined through said central section thus facilitating passage between said beds and said central section.

12. The mobile van of claim 11 wherein said rearward section includes means convertible to a sleeping accommodation.

13. The mobile van of claim 9 wherein said first and second doors each comprise a pair of panels hinged together to provide a folding action.

14. The mobile van of claim 7 wherein a flush toilet is located in said toilet region, and said movable partition means are arranged to conceal said flush toilet in the retracted position thereof.

15. The mobile van of claim 14 wherein a shower stall is also located in said toilet region alongside the flush toilet so that said passageway is defined between said kitchen facility on the one side and the toilet and shower stall facilities on the other side.

16. The mobile van of claim 15 wherein said movable partitions comprise first and second doors, each hinged to a respective portion fixed to the van body and pivotable from positions wherein they overlie and conceal at least substantial portions of the toilet and shower stall respectively, to their extended positions wherein they isolate said central section from the other sections whereby to allow use of the toilet and/or shower stall in privacy.

17. The mobile van of claim 16 wherein there is provided a swingable coat rack assembly mounted to pivot into and out of said shower stall and to be concealed by the door when the latter is in the retracted position.

18. The mobile van of claim 17 wherein said first and second doors and said coat rack assembly are all pivotable about mutually parallel axes.

19. The mobile van of claim 15 wherein said shower stall includes a frame and a fold-out base portion pivotally mounted to said frame to alternately assume two positions (a) a first retracted position during non-use of the shower in which such base extends below the movable partition associated with the shower stall to form a lower covering for same and (b) a second extended position during use of the shower in which the fold-out base extends generally horizontally on the floor of the van.

20. A mobile van including a separable privacy compartment having a shower stall therein, said shower stall including a frame, partition means movable between an open position for use of the shower stall and a closed position wherein upper portions of the shower stall are concealed, and a fold-out base portion pivotally mounted to said frame to alternately assume two positions, namely a first retracted position during non-use of the shower in which said base extends below the movable partition means to form a lower covering for the shower stall and a second extended position for use of the shower stall in which the fold-out base extends outwardly over the floor of the van and a swingable clothes rack assembly mounted to pivot into and out of said shower stall and to be concealed behind the movable partition means when the latter is in the closed position.

21. The mobile van of claim 20 wherein said partition means comprises a door pivotally mounted for movement about an axis and said clothes rack assembly being pivotable about an axis parallel thereto.

22. The mobile van of claim 20 wherein said privacy compartment further includes a toilet facility adjacent said shower stall and a further partition means movable between a closed position in which at least a portion of such toilet facility is concealed and an open position wherein the toilet facility is exposed for use.

23. The mobile van of claim 22 wherein said first mentioned partition means and said further partition means are arranged to perform a dual function in that, in their open positions, they form temporary barriers defining and isolating said privacy compartment from other sections of the van adjacent thereto.

24. A motor van having in a forward section thereof a stowable bed assembly, the assembly comprising a plurality of support boards and means to mount the boards in two alternate positions, (a) a storage position wherein the boards overlie one another closely adjacent the ceiling of the van and adjacent a frontal portion of said forward section, and (b) a sleeping position wherein the boards extend generally in co-planar relation to one another to define a bed spaced from the ceiling of the van, and retaining means associated with said means to mount the boards to secure the latter in both said storage and sleeping positions, wherein the means to mount the boards in the two alternate positions comprises a pair of elongated rigid support means hinged along first longitudinal edges thereof to the opposing sides of the van interior in the forward section, the support means having flange means attached to their second longitudinal edges and spaced from said first longitudinal edges, said support means being pivotable between a raised portion wherein the hinges are below said flange means and a lowered position wherein said flange means are below said hinge means, and the boards in their sleeping position resting on said flange means.

25. A motor van as defined in claim 24 wherein said retaining means includes means co-acting between said flange means and said boards to secure the latter in their co-planar sleeping positions.

26. A motor van as in claim 24 wherein said rigid support means are further provided with means to retain the support boards in said storage position when in their raised positions.

* * * * *